US008566615B2

(12) United States Patent
Balinsky et al.

(10) Patent No.: US 8,566,615 B2
(45) Date of Patent: Oct. 22, 2013

(54) DOCUMENT MANAGEMENT SYSTEM AND METHOD

(75) Inventors: Helen Balinsky, Wales (GB); Liqun Chen, Bristol (GB); Steven J. Simske, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 258 days.

(21) Appl. No.: 13/096,949

(22) Filed: Apr. 28, 2011

(65) Prior Publication Data
US 2012/0278631 A1 Nov. 1, 2012

(51) Int. Cl.
H04L 29/06 (2006.01)
(52) U.S. Cl.
USPC ............. 713/189; 380/277; 380/278; 380/44; 380/28
(58) Field of Classification Search
USPC .......................................................... 713/189
See application file for complete search history.

(56) References Cited

U.S. PATENT DOCUMENTS

| 2002/0001387 | A1* | 1/2002 | Dillon ............................ 380/262 |
| 2003/0081790 | A1* | 5/2003 | Kallahalla et al. ............ 380/281 |
| 2003/0217264 | A1 | 11/2003 | Martin et al. |
| 2004/0230793 | A1* | 11/2004 | Estrada et al. ................ 713/156 |
| 2005/0049977 | A1* | 3/2005 | Suisa .............................. 705/71 |
| 2005/0138188 | A1* | 6/2005 | Nassor et al. ................. 709/229 |
| 2005/0182933 | A1* | 8/2005 | Ritz et al. ...................... 713/168 |
| 2006/0047977 | A1* | 3/2006 | Hanasaki ....................... 713/193 |
| 2007/0219915 | A1* | 9/2007 | Hatano et al. .................... 705/57 |
| 2008/0005024 | A1* | 1/2008 | Kirkwood ........................ 705/50 |
| 2009/0150761 | A1 | 6/2009 | Sawicki et al. |
| 2010/0046749 | A1 | 2/2010 | Hatano et al. |
| 2010/0299313 | A1* | 11/2010 | Orsini et al. ................. 707/652 |

FOREIGN PATENT DOCUMENTS

JP 2005-184222 7/2005

OTHER PUBLICATIONS

Kollmann, Franz, Realizing fine-granular Read and Write Rights on Tree Structured Documents, Apr. 2007, The Second International Conference on Availability, Reliability and Security, ARES 2007, pp. 517-523.*
Chen, L. "Recommendation for Key Derivation Using Pseudorandom Functions", NIST Special Publication 800-108, Oct. 2009, pp. 1-21.

* cited by examiner

Primary Examiner — David Pearson
Assistant Examiner — Kenneth Chang

(57) ABSTRACT

A document management system and method are disclosed herein. An example of the document management system includes a composite document generation module that generates a composite document and a secret seed that is associated with an owner or initiator of the composite document, and a key derivation module that derives, from the secret seed and using a key derivation function, at least one of a key for encryption, a key for decryption, a key for signature, or a key for verification for a participant of a workflow associated with the composite document.

17 Claims, 2 Drawing Sheets

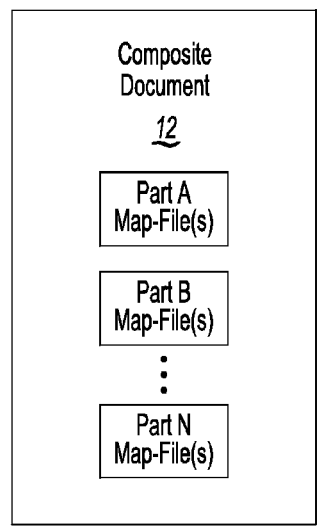
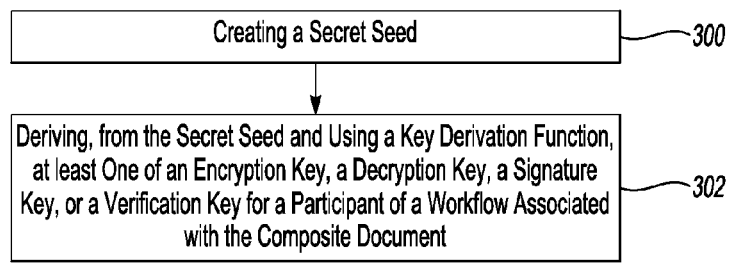
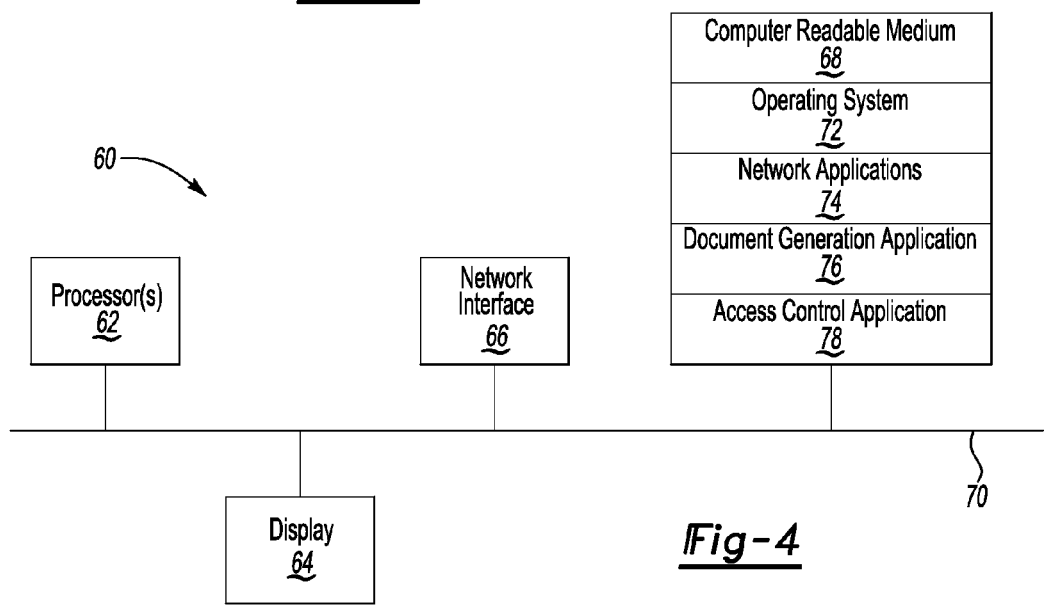

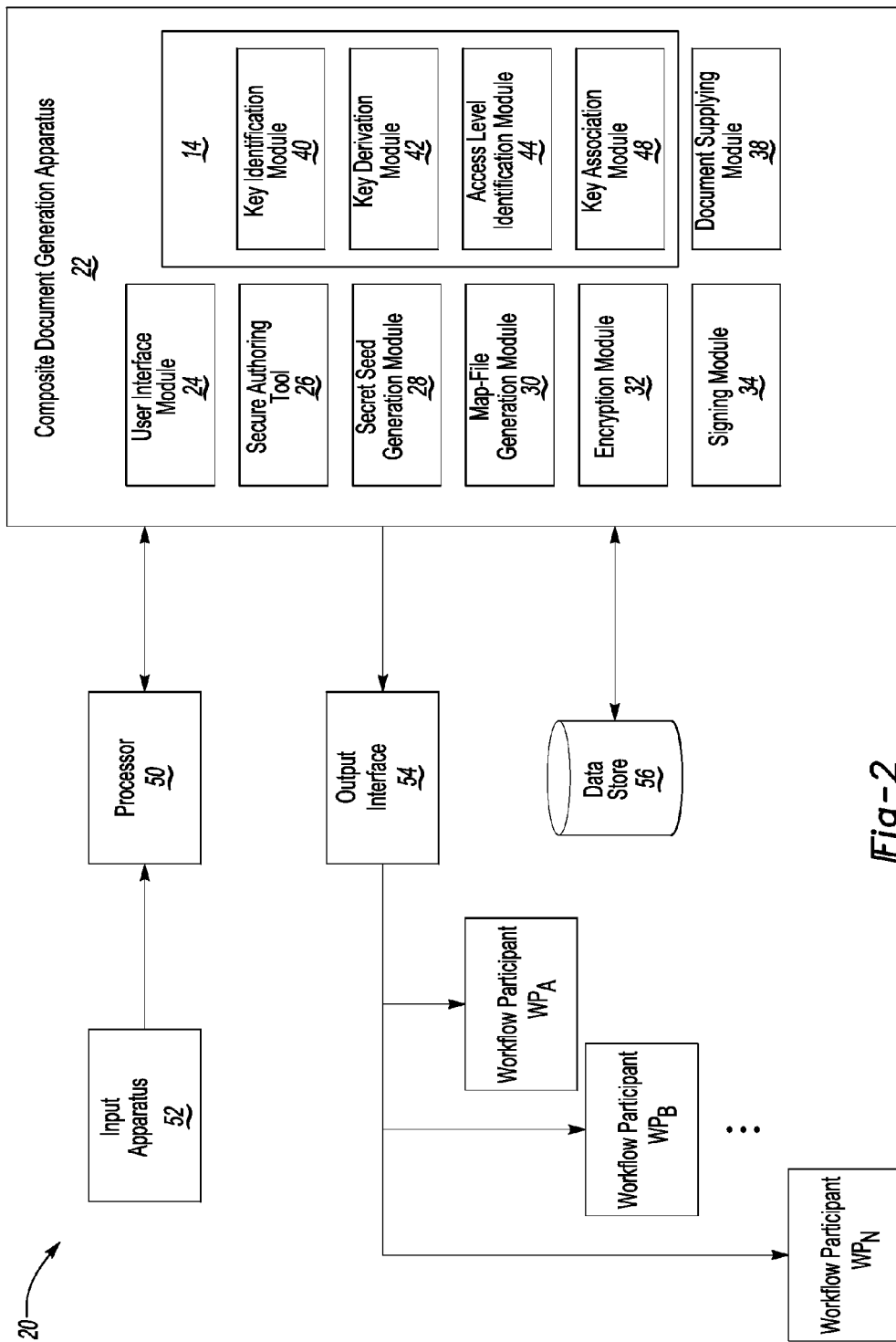

DOCUMENT MANAGEMENT SYSTEM AND METHOD

BACKGROUND

The present disclosure relates generally to a document management system and method.

Many digital documents have become a mixture, or a composite, of differentially formatted parts. Composite documents may be presented to a user by specialized software as one editable, browsable, approvable, playable document. Different parts are combined together through various serialization mechanisms, e.g. java jar-archive, HP dlf, etc. One example of a composite document is a document-based proposal, including product jpeg-images, a marketing way-clip, a ppt-presentation and an xsl-spreadsheet with financial details.

Various techniques have been proposed to prevent or reduce attacks on and counterfeiting of digital documents. One of these techniques involves restricting access to a database that stores the digital document or a network that is connected to the database via some secret or individualized information, such as, a user identification and password, biometrics, etc. Another of these techniques involves using publicly posted composite documents (PPCD). These documents are single composite files that integrate multiple parts and individual security access to the various parts.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic diagram of a composite document;

FIG. 2 is a schematic diagram of a document management system;

FIG. 3 is a flow diagram illustrating an example of a document management method; and FIG. 4 is a schematic diagram of a computer system that may be used as a platform for implementing or executing at least the example of the method shown in FIG. 3.

DETAILED DESCRIPTION

Examples of the document management system and method disclosed herein are used to ensure that differential access to one or more parts of a composite document may be achieved. In the examples disclosed herein, the various keys for the parts of a composite document are derived from the same secret seed, rather than being newly generated keys. It is believed that the derivation of keys reduces the overall computational overhead of the composite document creation process, while still providing the desired document security and participant anonymity.

As used herein, the term "workflow" refers to a defined set of steps, usually with task(s) at each step, which a composite document must pass through during its lifecycle. A composite document is a document including several individually addressable and accessible items/parts in the form of separate files or file fragments (e.g., portable document formats, spreadsheets, JPEG or any other image, word processing documents, hypertext markup language (html), etc). As one example, the parts may include signature lines, html fragments, xml nodes, presentation slides, word processing text boxes, parts of a spreadsheet document (e.g., cells or columns), an electronic object containing drawings, an electronic object having flash video capabilities, etc. The document parts may be of the same format, or one or more of the document parts may be of a different format than one or more of the other document parts. It is to be understood that any logical element or combination of elements within a document can be parts, e.g., from a single word, field, etc. to massive file sets.

In one example, the workflow is an automated process during which the document(s), information, and/or task(s) are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, provenance, recall, other logistics, etc.), environmental or sensor data monitoring workflows, or other suitable workflows (e.g., statistics (e.g., inventory, etc.), compliance, auditing, etc.). In other words, a workflow is any defined set of tasks to complete associated with a composite document.

The workflow may involve numerous participants, many or all of whom do not or may not know the other participants. The workflow participants may participate in the workflow using individual computing systems or devices. The computing systems enable the participants to receive the composite document, and when granted sufficient access, to view, edit, and/or acknowledge one or more of the parts. The individual computing systems may be stationary (e.g., desktop computers) or mobile (e.g., laptop computers, tablet computers, netbooks, cellular/smart telephones, personal digital assistants (PDAs), etc.)). The individual computing systems run one or more applications that enable the participants to obtain access to item(s) of the composite document according to preset (granted) access rights, and that perform decryption, encryption, signature verification, and/or signing.

FIG. 1 illustrates one example of a publicly posted composite document (PPCD) 12. A master copy (not shown) of the PPCD 12 is created in a secure environment (described further in reference to FIG. 2) and access to this master copy is limited (for example, to the document master/creator) and controlled. The PPCD 12 is a distribution version that is created from the master copy.

In the examples disclosed herein, the publicly posted composite document (i.e., the distribution version) 12 may include i) individual content items or parts (e.g., A, B, ..., N), each of which consists of one or more individual files and fragments, ii) one or more map-files for each participant in the workflow, where each map-file is a subset of access keys to document parts corresponding to the access granted to a particular participant, and, in some instances, iii) an entry table, which is a fast filtration mechanism to identify a participant's map-file without exposing the participant's identity. The composite document 12 may also include, in some instances, a wrap, which creates a mandatory workflow entry by wrapping access control data in the form of map-files starting from the last workflow participant moving through the workflow to the first workflow participant. One example of a wrap is described in International Patent App. No. PCT/US11/23068, filed Jan. 28, 2011, which is incorporated herein by reference in its entirety.

The various document parts A, B, ..., N are each encrypted by a respective key (e.g., a symmetric Advanced Encryption Standard (AES) key). Thus, for a document with N individually accessible parts, N keys are generated for the parts encryption (decryption) alone. Additionally, each part A, B, . . . , N is individually signed using a specially generated signature key, which would require N pairs of signature-verification keys to be generated. The PPCD 12 may be accessed by many workflow participants, each of which requires individual access to one or more of the document parts. This access is provided by giving to each participant his/her own map-file. As mentioned above, the map-file is a subset of access keys for one or more document parts that are selected from the overall set according to the access granted to the particular workflow participant. Each map-file is encrypted using a specially generated key (e.g., using an AES key) and is placed back into the PPCD 12. As such, if there are M workflow participants for a PPCD 12, then M keys are required to encrypt the corresponding map-files. Some participants might be required to access a document more than once, for example, at different workflow steps. This scenario may result in multiple map-files for a single participant because one map-file is generated that will provide the access key that corresponds to the particular participant at each particular workflow step.

When a PPCD 12 is created from the master copy, at least N+M encryption keys and N pairs of signature-verification keys are utilized. The sum of 2N+M may be large, for example, when the document contains many parts (which cannot be combined with other parts because they have at least one difference in the table of access rights for the participants) and multiple workflow participants are involved. The generation of so many keys may increase computational overhead. As will be described further herein, in the examples disclosed herein, these keys are derived using key derivation function (KDF) rather than being newly (randomly) generated. Key derivation reduces the computational overhead that is otherwise involved in the PPCD creation process when the keys are newly generated.

Referring now to FIG. 2, an example of the document management system 20 is depicted. It is to be understood that this is a simplified block diagram of the system 20, and that other components may be added or existing components may be removed, modified or rearranged.

The document management system 20 includes a secure environment for generating master composite documents and their corresponding publicly posted composite document distribution versions 12 and for assigning differential access to various parts A, B, . . . , N of the PPCD 12. It is to be understood that once the master copy and the PPCD 12 are securely created using the system 20, the PPCD 12 can be posted publicly, such that anyone can see it. However, the individual document parts A, B, . . . , N of the PPCD 12 cannot be decrypted and become visible unless the participant has the appropriate key(s) (e.g., in his/her map-file).

One example of the composite document generation apparatus 22 includes a user interface module 24, a secure authoring tool 26, a secret seed generation module 28, a map-file generation module 30, an encryption module 32, a signing module 34, a map-file/key supplying module 36, a document supplying module 38, and a differential access control apparatus 14. In one example, the secure authoring tool 26 includes the apparatus 14 and all of the modules 28, 30, 32 and 34 that are utilized to create the master version and the distribution version of the composite document. An example of the differential access control apparatus 14 includes a key identification module 40, a key derivation module 42, an access level identification module 44, and a key association module 48.

The various components of the system 20 enable the secure generation of the master version and the distribution version of the composite document by allowing a document owner/initiator/master to select all composite document parts and data fragments and add them to the document master copy; to select workflow participants, including their roles, public keys and contacts (e.g., loaded from LDAP), and add them to the document master copy; to assign desired access control to each participant; to tessellate the same access content-items together to form parts of a distributed version of the composite document (i.e., the PPCD 12); to derive, from a secret seed, access keys for each part; to encrypt and sign the parts and to place the parts into the distributed version; to store the access keys in the document master copy; to generate, encrypt and sign individual map-files for each workflow participant for each workflow step; to generate an entry table; and to encrypt (by records), sign and place the entry table into the distributed version of the composite document (PPCD 12). These and other aspects of the secure document generation process are further described herein.

The apparatuses 14, 22 and modules 24-48 are configured to be implemented and/or executed by an electronic processing device (e.g., processor 50). In one example, the apparatuses 14 and/or 22 include an integrated and/or add-on hardware device of a computing device which includes the processor 50. As another example, apparatuses 14 and/or 22 include a computer readable storage device upon which software for each of the modules 24-48 is stored and executed by the processor 50. The modules 24-48 may include software modules, hardware modules, or a combination of software and hardware modules.

Examples of the electronic processing device include a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., computer readable code) may be loaded onto one or more of the modules, and stored in a memory thereof. Such programs and/or software are executable via the processing device 50.

As shown in FIG. 2, the processor 50 receives input from the document owner/initiator/master via an input apparatus 52. The input apparatus 52 may include one or more components that enable the document master to access the composite document generation apparatus 22 in order to create the master and distribution versions of the composite document and its associated workflow using the secure authoring tool 26, the apparatus 14, and the various modules 28, 30, 32 and 34. As one example, a new master version of the composite document may be created from a template, such as, for example, an application form process. The input apparatus 52 allows the document master to input data, supply part(s), and/or supply document(s). If the distribution version of the document 12 was previously created but not placed into a workflow, the system 20 may be used to retrieve the stored document (e.g., from data storage 56) and create a workflow therefore.

Various manners in which the modules 24-48 may be implemented will now be described. When generating the master and distribution versions of the composite document using the apparatus 22, the document master can create a new secret seed (see reference numeral 300 of FIG. 3) or can retrieve a previously generated secret seed (which is particular to the document master/creator) using the secret seed generation module 28. The secret seed generation module 28 is a random bit generator, which utilizes, for example, one of the algorithms specified in ISO/IEC 18031 to generate the secret seed. The secret seed is used as a document master key, which is a master symmetric key that is associated with the particular document master. In an example, the secret seed is a symmetric key that is used in a key derivation function, and is not used in asymmetric algorithms. It is to be understood, however, that the keys derived from the secret seed may be suitable for use in asymmetric or symmetric algorithms. The secret seed and the keys derived therefrom are also described further below.

As briefly described above, after the document master copy is created and the workflow participants $WP_A, WP_B, \ldots, WP_M$ are selected, the document master utilizes the differential access control apparatus 14 to assign access levels for the various participants $WP_A, WP_B, \ldots, WP_M$ to access each of the parts A, B, ..., N of the document distribution version 12.

Generally, the differential access control apparatus 14 is configured to differentially control access to one or more of the document parts A, B, ..., N in the digital document 12 by each of the workflow participants $WP_A, WP_B, \ldots, WP_M$ through controlled distribution of derived keys (using map-files) to each of the workflow participants $WP_A, WP_B, \ldots, WP_M$. The differential access control apparatus 14 may include a hardware device, such as, a server, a circuit, etc., configured to perform various functions in differentially controlling access to the parts A, B, ..., N.

The differential access control apparatus 14 is configured to identify the differential access levels to be granted to each of the workflow participants $WP_A, WP_B, \ldots, WP_M$. In one example, the differential access control apparatus 14 is in the secure environment (where the composite document owner/creator/master has access to the generation apparatus 22), and some or all the computing devices of the workflow participants $WP_A, WP_B, \ldots, WP_M$ are outside of the secure environment. In other words, some or all of the workflow participants $WP_A, WP_B, \ldots, WP_M$ may not access the master version/copy of the composite document from a common database that controls access to documents generated using the system 20. Instead, the distribution version of the document 12 is supplied to and among the workflow participants $WP_A, WP_B, \ldots, WP_M$ through other channels, for instance, electronic mail (e-mail), public posting systems (e.g., cloud computing systems where documents may be uploaded and downloaded, file sharing systems (e.g., Sharepoint, etc.)), direct file transfer, removable storage medium (e.g., a compact disc (CD), a digital video disk (DVD), a universal serial bus (USB) key, or the like), etc. Some or all of the workflow participants $WP_A, WP_B, \ldots, WP_M$ may not be granted access to the secure environment in instances where such access is impractical or prohibited.

As a workflow is performed, the document 12 propagates through the workflow and is supplied by the first workflow participant $WP_A$ to a second workflow participant $WP_B$ (for instance, by the first workflow participant $WP_A$ e-mailing the digital document to the second participant $WP_B$ or by mailing a CD containing the digital document 12, etc.), by the second workflow participant $WP_B$ to a third workflow participant $WP_C$, and so forth. Alternatively, the digital document 12 may be retrieved by the workflow participants $WP_A, WP_B, \ldots, WP_M$, for example, via a public posting forum. According to an example, the order in which the digital document 12 is supplied between at least some of the workflow participants $WP_A, WP_B, \ldots, WP_M$ is predetermined. In another example, the order in which the workflow participants $WP_A, WP_B, \ldots, WP_M$ access the digital document 12 may not be predetermined.

Access levels to the one or more parts A, B, ..., N to be granted to each of the workflow participants $WP_A, WP_B, \ldots, WP_M$ are identified, for instance, by the access level identification module 44. More particularly, for instance, the access level identification module 44 may track instructions received through the user interface module 24 from the input apparatus 52 (via document master) that identify the workflow participants $WP_A, WP_B, \ldots, WP_M$ that are to receive the digital document 12 as well as the differential access rights to be granted to each of the workflow participants $WP_A, WP_B, \ldots, WP_M$ to the one or more parts A, B, ..., N. In addition, the access level identification module 44 may store the information received from the input apparatus 52 in the data store 56. In another example, access levels to be granted to the one or more parts A, B, ..., N may be stored in the data store 56 and the access level identification module 44 may access the data store 56 to retrieve the access level information.

The access levels that a participant $WP_A, WP_B, \ldots, WP_M$ may be given for any given part A, B, ..., N of the document 12 include "no access", "validate access", "read only access", and "modify access" or "read/write access". A single workflow participant $WP_A, WP_B, \ldots, WP_M$ may be granted different levels of access to the parts A, B, ..., N contained in an encrypted and signed PPCD 12. In addition, any workflow participant $WP_A, WP_B, \ldots, WP_M$ may be granted a different level of access to one or more of the parts A, B, ..., N than any other workflow participant $WP_A, WP_B, \ldots, WP_M$.

When a participant $WP_A, WP_B, \ldots, WP_M$ is granted no access (NA), the participant $WP_A, WP_B, \ldots, WP_M$ does not receive the document 12 at a particular step.

When a participant $WP_A, WP_B, \ldots, WP_M$ is granted validate access (VA), the participant $WP_A, WP_B, \ldots, WP_M$ is granted the ability to receive one or more of the parts A, B, ..., N, but is not granted the ability to open or otherwise read or modify these parts A, B, ..., N. When given validate access (as opposed to no access, for example), a participant $WP_A, WP_B, \ldots, WP_M$ has to verify authenticity of such parts without getting access to the part contents.

When a participant $WP_A, WP_B, \ldots, WP_M$ is granted read only access (RO) to one or more parts A, B, ..., N of the encrypted and signed digital document 18, the participant $WP_A, WP_B, \ldots, WP_M$ is granted the ability to open and access the one or more of the parts A, B, ..., N associated with the read only access level. When granted read only access, it is to be understood that the workflow participant $WP_A, WP_B, \ldots, WP_M$ is not authorized to modify those parts A, B, ..., N associated with the read only access level.

When a participant $WP_A, WP_B, \ldots, WP_M$ is granted modify access (e.g., read/write (RW) access) to one or more parts A, B, ..., N of the encrypted and signed digital document 18, the participant $WP_A, WP_B, \ldots, WP_M$ is granted the ability to both read and modify the one or more of the parts A, B, ..., N associated with the modify access level.

After the access levels are assigned, the key(s) that is/are to be supplied to each of the workflow participants $WP_A, WP_B, \ldots, WP_M$ for one or more of the parts A, B, ..., N is/are identified based upon the identified level of access, for instance, by the key identification module 40. Each part A, B, ..., N is encrypted by its own specially-derived and assigned encryption key E. Extra keys for each part A, B, ..., N may also be newly generated or derived, namely a signature key S and a signature verification key V. In one example, the signature key S is derived (using the secret seed described below) and then the corresponding verification key V is computed from the signature key S. In another example however, it may be computationally beneficial, required by policy, and/or required to achieve the desired level of security to generate a new signature/verification key pair. In still other instances, it may be required or desired to separate the generation of the signature key S and the verification key V. In some instances (e.g., when RW, RO, or VA access is given), every part A, B, . . . , N of the composite document 12 is signed by its own signature key S and every workflow participant $WP_A$, $WP_B$, . . . , $WP_M$ is securely given the corresponding signature verification key V for each part A, B, . . . , N. Upon reception, it may be mandatory that every workflow participant verifies the signature of every part using the corresponding signature verification key V.

As such, access control for each composite document part A, B, . . . , N is enabled by 4 keys: encryption key(s) E, decryption key(s) D, signature key(s) S, and/or verification key(s) V. It is to be understood that when symmetric cryptography is used, E=D. Validate access is controlled by providing the participant $WP_A$, $WP_B$, . . . , $WP_M$ with the verification key V alone, which will allow the participant $WP_A$, $WP_B$, . . . , $WP_M$ to validate the part authenticity. Read only access is controlled by having the decryption key D (without the encryption and signature keys E, S). Participants $WP_A$, $WP_B$, . . . , $WP_M$ given read only access are also provided with the verification key V, as mentioned above. Read and write (i.e., modify) access requires all four keys E, D, S, and V. When modify access is given, the authenticity of a part A, B, . . . , N is verified using V, and the part A, B, . . . , N is then decrypted using D, modified as needed, encrypted using E and then signed using S.

The key(s) for the part(s) A, B, . . . , N are derived from the secret seed using the key derivation module 42 (see reference numeral 302 of FIG. 3). The key derivation module 42 is configured with a key derivation function that can derive symmetric keys or asymmetric keys from the secret seed. Symmetric keys include a single key for performing both encryption and decryption and/or a single key for performing both signature and verification. Asymmetric keys include pairs of keys: an encryption and decryption key pair and/or a signature and verification key pair. It is to be understood that the key(s) (encryption E, decryption D, signature S, verification V) and type (symmetric or asymmetric) that are derived will depend, at least in part, upon the number of parts in the PPCD 12, the number of map-files, and the number of workflow steps.

The key derivation function (KDF) may be selected from any one-way function, such as one-way hash functions. The key derivation function is a function with which the secret seed and, in some instances, other input data are used to derive keys. Examples of the key derivation function are KDF1 and KDF2, which are defined in ISO/IEC 18033-2. KDF1 is equivalent to the MGF1 function from IEEE P1363a and PKCS#1 v2.1, and KDF2 is the same as the KDF based on the concatenation algorithm in ANSI X9.42. These examples are based on any secure hash-functions. The key derivation function may also be selected from families of KDFs that are based upon pseudorandom functions, as described in the NIST Special Publication 800-108 "Recommendation for Key Derivation Using Pseudorandom Functions" by Lily Chen (October 2009).

The key derivation function may also utilize an extra string of data in combination with the secret seed to derive the key(s). As examples, the extra string of data may include the document identification (i.e., the current document ID or name, e.g., in .pex), a document part number, a workflow step/stage number, other additional text, and combinations thereof. Examples of other additional text include the time when the master and/or distribution versions of document was/were created, the time when the distribution version of the document 12 is going to be edited, the policy of how the distribution version of the document 12 should be processed, or the like, or combinations t. The additional text is believed to contribute to the freshness of the derived key.

As mentioned above, the KDF may be used to derive symmetric keys or asymmetric keys. As one example, the derived key may be a symmetric encryption/decryption key derived according to the following equation:

$$\text{E/D Key} = \text{KDF}(\text{secret seed} \| \text{document id} \| \text{part number} \| \text{workflow step number})$$

where the operator "$\|$" means appending. When it is desirable to derive asymmetric keys, the secret seed and KDF are first used to generate a private key (this is accomplished in the same manner as deriving symmetric keys), and then the private key is used to generate the corresponding public key.

It is to be understood that the length of any derived keys depends, at least in part, upon the size of the secret seed. Generally, the derived key(s) are shorter than the secret seed. As such, in one example when generating the secret seed, it may be desirable to know how long the derived key(s) should be. For example, if it is desirable that the derived key(s) be 128-bit AES key(s), then a suitable secret seed would be 256-bits long, regardless of the number of keys that will be derived. When generating the secret seed, it may be desirable to make it suitable for long-term use and deriving multiple keys, without any particular workflow being associated therewith. When a long-term secret seed is generated, it may be used by the document master for multiple different workflows. In theory, the longer that the secret seed is, the more keys that can be derived therefrom. Additionally, longer secret seeds may be desirable for security reasons (e.g., to prevent someone from identifying the secret seed).

It is believed that the key derivation method described herein is secure. For example, a participant $WP_A$, $WP_B$, . . . , $WP_M$ that receives the E/D Key described above can utilize the key to gain access to the part A, B, . . . , N associated therewith. However, it is believed that he/she cannot readily compute the secret seed from the E/D Key and thus cannot derive the other (not given) keys for the document parts A, B, . . . , N. This is because the KDF algorithm holds the property of one-way-ness. By one-way-ness, it is meant that computing from the secret seed to the derived key(s) is easy, but computing from the derived key(s) to the secret seed is difficult. When a one-way KDF algorithm is utilized, the best known method of computing the secret seed from the derived key(s) is simple guessing and searching. In one example, the size of the secret seed is 256 bits. The average job for the participant $WP_A$, $WP_B$, . . . , $WP_M$ or a would be attacker/counterfeiter to compute this secret seed successfully would require computing $2^{128}$ KDFs, and it is believed that this is computationally infeasible. While the extra data string (e.g., (document id$\|$part number$\|$stage number$\|$some extra text)) can be mined by someone with unlimited access to the system 20, the original secret seed has full security.

In one example, each of the derived keys will be used by one of the participants $WP_A$, $WP_B$, . . . , $WP_M$ to access one part A, B, . . . , N at one workflow step/stage. The key(s) is/are derived prior to initiation of the workflow, and is/are associated with one part A, B, . . . , N, for instance, by the key association module 48. Once the key(s) are associated with the appropriate document part A, B, . . . , N and participant $WP_A$, $WP_B$, . . . , $WP_M$, the key(s) may be distributed to the respective participants $WP_A$, $WP_B$, . . . , $WP_M$. In one example, the key(s) are supplied to the respective workflow participants $WP_A$, $WP_B$, . . . , $WP_M$ via the PPCD 12 itself. For example, the appropriate key(s) for each participant $WP_A$, $WP_B$, . . . , $WP_M$ for each workflow step are placed in respective map-files of the participants $WP_A$, $WP_B$, ..., $WP_M$. The map-files are generated via the map-file generation module 30. The map-files are encrypted and placed into the distribution version of the composite document (i.e,. PPCD 12). This is advantageous because the PPCD 12 (containing the map-files and subsets of keys) can be sent by any desirable distribution channel.

Prior to initiation of the workflow, the one or more parts A, B, ..., N are encrypted using the specially derived encryption keys E, for instance, by the encryption module 32. The encryption module 32 may use any standard or proprietary encryption mechanism, such as, for instance, symmetric AES encryption, Twofish encryption, asymmetric RSA, etc. According to an example, each of the parts A, B, ..., N that are to be provided with differential access levels may be encrypted using respective specially derived encryption keys E.

Also prior to initiation of the workflow, the one or more encrypted parts A, B, ..., N may be signed using the specially derived (or newly generated) signature keys S, for instance, by the signing module 34. The one or more encrypted parts A, B, ..., N may be signed, for example, through use of a Digital Signature Algorithm, RSA based signatures, etc. According to an example, each of the parts A, B, ..., N that has been encrypted is signed using the specially derived (or newly generated) signature key S.

In some instances, e.g., when map-files are utilized, the map-file generation module 30 may also generate an entry table that is supplied with the composite document 12. As mentioned above, the entry table is a fast filtration mechanism to identify a participant's map-file without exposing the participant's identity. This involves encrypting a small known string of characters for each workflow participant. Each user attempts to decrypt the strings until the correctly decrypted string is found.

The PPCD 12 is then supplied to the first workflow participant $WP_A$, for example, via the document supplying module 38 in conjunction with the output interface 54, which uses any of the channels previously described. The document distribution version (i.e., PPCD 12) is exported by the document supplying module 38 out of the master version of the document. The master version is retained in the secure location (e.g., data store 56), while the secure distribution version (i.e., PPCD 12) is shipped among workflow participants by any available channel. It is to be understood that the key(s) and the encrypted and signed composite document 12 may also be stored in the data store 56 prior to delivery to the workflow participants $WP_A$, $WP_B$, ..., $WP_M$. The data store 56 may include volatile and/or non-volatile memory, such as DRAM, EEPROM, MRAM, phase change RAM (PCRAM), Memristor, flash memory, and the like. In addition, or alternatively, the data store 56 may include a device configured to read from and write to a removable media, such as, a floppy disk, a CD-ROM, a DVD-ROM, or other optical or magnetic media.

As a workflow is performed, the document 12 propagates through the workflow and is supplied by the first workflow participant $WP_A$ to a second workflow participant $WP_B$ (for instance, by the first workflow participant $WP_A$ e-mailing the document 12 to the second participant $WP_B$ or by mailing a CD containing the digital document 12, etc.), by the second workflow participant $WP_B$ to a third workflow participant $WP_C$, and so forth. Alternatively, the document 12 may be retrieved by the workflow participants $WP_A$, $WP_B$, ..., $WP_M$, for example, via a public posting forum. According to an example, the order in which the document 12 is supplied between at least some of the workflow participants $WP_A$, $WP_B$, ..., $WP_M$ is predetermined. In another example, the order in which the workflow participants $WP_A$, $WP_B$, ..., $WP_M$ access the document 12 may not be predetermined.

When the PPCD 12 is propagated through the workflow, each workflow participant $WP_A$, $WP_B$, ..., $WP_M$ is provided with the entire PPCD 12, although one or more parts A, B, ..., N of the composite document may be accessible for reading only, accessible for reading and writing, or not accessible for reading or writing. It is desirable to provide the entire PPCD 12 because later participant(s) in the workflow may require access to parts that an earlier workflow participant cannot access.

It is to be understood that the system 20 described herein may enable the PPCDs 12 to be uploaded and downloaded, or to be shared via a shared drive or a cloud computing network. In this example, a variety of workflow participants $WP_A$, $WP_B$, ..., $WP_M$ can access the composite documents from individual computers by accessing the shared drive or cloud computing network. When part of the system 20, the shared drive or cloud computing network may be associated with a network of interconnected computers and/or other electronic devices (e.g., scanners, printers, etc.), including virtualized and/or redundant processors, banks of processors and/or servers, etc. It is to be understood that the components of the shared drive or cloud computing network may be implemented in a consolidated location, or portion(s) of the shared drive or cloud computing network may be implemented at different locations. In one example, the shared drive or cloud computing network is a virtualized bank of computers (e.g., processors and/or servers) that enables Internet-based computing (through which the various apparatuses and modules can be accessed). Software and data associated with the shared drive or cloud computing network are stored on servers and their associated memory.

FIG. 4 illustrates a computing device 60 configured in accordance with the examples disclosed herein. The device 60 includes one or more processors 62, such as a central processing unit; one or more display devices 64, such as a monitor; one or more network interfaces 66, such as a Local Area Network LAN, a wireless 802.11x LAN, a 3G mobile WAN or a WiMax WAN; and one or more computer-readable mediums 68. Each of these components is operatively coupled to one or more buses 70. For example, the bus 70 may be an EISA, a PCI, a USB, a FireWire, a NuBus, or a PDS.

The computer readable medium 68 may be any suitable medium that participates in providing instructions to the processor 62 for execution. For example, the computer readable medium 68 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 68 may also store other software applications, including word processors, browsers, email, Instant Messaging, media players, and telephony software.

The computer-readable medium 68 may also store an operating system 72, such as Mac OS, MS Windows, Unix, or Linux; network applications 74; document generation applications 76; and differential access control applications 78. The operating system 72 may be multi-user, multiprocessing, multitasking, multithreading, real-time and the like. The operating system 72 may also perform basic tasks such as recognizing input from input devices, such as a keyboard or a keypad; sending output to the display 63 and one or more design tools (not shown); keeping track of files and directories on medium 68; controlling peripheral devices, such as disk drives, printers, image capture device; and managing traffic on the one or more buses 70.

The network applications 74 includes various components for establishing and maintaining network connections, such as software for implementing communication protocols including TCP/IP, HTTP, Ethernet, USB, and FireWire.

The document generation application 78 and the differential access control application 78 provide software components for controlling the workflow 10 of a digital document 12, 18 among a plurality of workflow participants $WP_A$, $WP_B$, ..., $WP_M$, as described above. In certain examples, some or all of the processes performed by the applications 77 and 78 may be integrated into the operating system 72. In other examples, the processes may be at least partially implemented in digital electronic circuitry, or in computer hardware, firmware, software, or in any combination thereof.

The derived key(s) disclosed herein advantageously decrease the computational overhead often associated with creating a publicly posted composite document 12. All of the key(s) are derived from the same secret seed, rather than being newly generated keys.

It is also believed that the derived key(s) disclosed herein may also be used in an anonymous signature scheme if both security and privacy are required. This scheme allows one to use the derived private signature key S to sign multiple messages, but each signature is not linked with other signatures created by the same signer. As such, the signatures reveal neither the signer's identity nor his key. One example of such an anonymous digital signature is a direct anonymous attestation (DAA) using a random basename. The details of the DAA scheme can be found in U.S. patent application Ser. No. 10/718,151, filed Nov. 20, 2003 and published as 2005/0110801 and U.S. patent application Ser. No. 12/322,368, filed Jan. 30, 2009 and published as 2009/0210716. Generally, a DAA scheme involves three types of entities, a DAA issuer, a set of DAA signers, and a set of DAA verifiers. In the examples disclosed herein, each document workflow participant $WP_A$, $WP_B$, ..., $WP_M$ is a DAA signer as well as a DAA verifier. The DAA issuer is a semi-trusted third party, which is similar to a certificate authority and which creates a certificate (also known as "credential" in most of the DAA papers) on each signer's public key. The certificate is a signature on the signer's public key under the issuer's private key. During the DAA signing process, the signer's public key and certificate are randomized. As a result, when given the signature, one (including the issuer) cannot find out who the signer is.

While several examples have been described in detail, it will be apparent to those skilled in the art that the disclosed examples may be modified. Therefore, the foregoing description is to be considered non-limiting.

What is claimed is:

1. A document management system, comprising:
    an electronic processing device of a computing device;
    a composite document generation apparatus including a hardware device of the computing device or a non-transitory, tangible computer readable storage device of the computing device;
    a composite document including a plurality of parts, the composite document to be generated by the composite document generation apparatus;
    a secret seed that is associated with an owner or initiator of the composite document;
    a key derivation module that derives i) a respective set of access keys for each part of the composite document, each set including at least a respective encryption key, and ii) from the secret seed and using a key derivation function, a respective subset of keys for each participant of a workflow associated with the composite document, each subset of keys including different keys based on an access level granted to the participant associated with the subset and including at least one of a key for encryption, a key for decryption, a key for signature, or a key for verification;
    wherein the key derivation module includes software modules stored on the non-transitory computer readable storage device and executable by the electronic processing device, hardware modules, or a combination of the software and hardware modules;
    a map-file generation module including software modules stored on the non-transitory computer readable storage device and executable by the electronic processing device, hardware modules, or a combination of the software and hardware modules; and
    a respective map-file generated by the map-file generation module for each of the participants of the workflow, wherein the respective map-file stores the subset of keys for the respective participant.

2. The document management system as defined in claim 1 wherein the at least one of the key for encryption, the key for decryption, the key for signature, or the key for verification is based upon an extra data string selected from a document ID, a document part number, a workflow stage number, and combinations thereof.

3. The document management system as defined in claim 1 wherein the key derivation function is a one-way hash function.

4. The document management system as defined in claim 1 wherein the at least one of the key for encryption, the key for decryption, the key for signature, or the key for verification is associated with one part of the composite document and one step of the workflow.

5. A composite document system, comprising:
    an electronic processing device of a computing device;
    a non-transitory, tangible computer readable medium of the computing device;
    a map-file generation module including software modules stored on the non-transitory, tangible computer readable medium; and
    a composite document stored on the non-transitory, tangible computer readable medium, the composite document including:
        a plurality of parts;
        a set of access keys for each of the plurality of parts, each set including at least a respective encryption key;
        a map-file generated by the map-file generation module for each of a plurality of participants in a workflow associated with the composite document;
        a respective subset of access keys for each of the plurality of participants distributed within the respective map-files of the participants, the respective subset i) including different access keys for each of the participants, ii) including at least one of a key for encryption, a key for decryption, a key for signature, or a key for verification, iii) being derived from a secret seed associated with an owner or initiator of the composite document, and iv) being associated with one of the plurality of a parts; and
        a second subset of access keys for at least one of the plurality of participants, the second subset of access keys i) being distributed within the respective map-file of the at least one of the plurality of participants, ii) including at least one of a key for encryption, a key for decryption, a key for signature, or a key for verification, iii) being derived from the secret seed associated with the owner or initiator of the composite document, and iv) being associated with an other one of the plurality of a parts.

6. The composite document system as defined in claim 5 wherein the key for encryption and the key for decryption are a symmetric key, and the key for signature and the key for verification are a symmetric key.

7. The composite document system as defined in claim 5 wherein the key for encryption and the key for decryption are a pair, and wherein the key for signature and the key for verification are a pair.

8. The composite document system as defined in claim 5 wherein the respective subset of access keys includes one of:
   the key for verification when the respective participant has validate access to the one of the plurality of parts;
   the key for decryption and the key for verification when the respective participant has read only access to the one of the plurality of parts; and
   the key for encryption, the key for decryption, the key for signature, and the key for verification when the respective participant has read and write access to the one of the plurality of parts.

9. A document management method, comprising:
   creating a secret seed for a composite document including a plurality of parts;
   deriving, from the secret seed and using a key derivation function, a subset of access keys for a participant of a workflow associated with the composite document, the subset of access keys being based on an access level of the participant for one part of the composite document and the subset of access keys including at least one of a key for encryption, a key for decryption, a key for signature, or a key for verification;
   placing the subset of access keys into a map-file of the participant;
   placing the map-file into the composite document;
   encrypting each of the plurality of parts of the composite document using a respective encryption key that is different from the subset of access keys;
   deriving, from the secret seed and using the key derivation function, a second subset of access keys for the participant, the second subset of access keys being based on an other access level of the participant for an other part of the composite document and the second subset of access keys including at least one of a second key for encryption, a second key for decryption, a second key for signature, or a second key for verification; and
   placing the second subset of access keys into the map-file of the participant;
   wherein each of the steps is performed by a processor executing computer readable code embodied on a non-transitory, tangible computer readable medium.

10. The document management method as defined in claim 9, further comprising basing the at least one of the key for encryption, the key for decryption, the key for signature, or the key for verification upon an extra data string selected from a document ID, a document part number, a workflow stage number, and combinations thereof.

11. The document management method as defined in claim 9 wherein the key derivation function is a one-way hash function.

12. The document management method as defined in claim 9 wherein prior to deriving the at least one of the key for encryption, the key for decryption, the key for signature, or the key for verification, the method further comprises determining the access level of the participant of the workflow associated with the composite document.

13. The document management method as defined in claim 9 wherein deriving the at least one of the key for encryption, the key for decryption, the key for signature, or the key for verification includes deriving a symmetric key for encryption and decryption.

14. The document management method as defined in claim 9 wherein deriving the at least one of the key for encryption, the key for decryption, the key for signature, or the key for verification includes deriving a symmetric key for signature and verification.

15. The document management method as defined in claim 9 wherein deriving the at least one of the key for encryption, the key for decryption, the key for signature, or the key for verification includes deriving the key for encryption and the key for decryption as an asymmetric pair, and deriving the key for signature and the key for verification as another asymmetric pair.

16. The document management method as defined in claim 9, further comprising:
   deriving, from the secret seed and using the key derivation function, a second subset of access keys for a second participant of the workflow, the second subset of access keys being based on an access level of the second participant for the one part of the composite document and the second subset of access keys including at least one of a second key for encryption, a second key for decryption, a second key for signature, or a second key for verification;
   placing the second subset of access keys into a map-file of the second participant; and
   placing the map-file of the second participant into the composite document.

17. The document management method as defined in claim 9, further comprising encrypting the map-file of the participant using a specially generated key that is different from the respective encryption keys for encrypting each of the plurality of parts.

* * * * *